United States Patent
Fujita-Yuhas

(10) Patent No.: US 8,879,692 B2
(45) Date of Patent: Nov. 4, 2014

(54) RECORDING A NEW VOICE GREETING

(75) Inventor: Tim J. Fujita-Yuhas, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 2150 days.

(21) Appl. No.: 11/457,590

(22) Filed: Jul. 14, 2006

(65) Prior Publication Data

US 2008/0037732 A1 Feb. 14, 2008

(51) Int. Cl.
*H04M 1/64* (2006.01)
*H04M 3/533* (2006.01)

(52) U.S. Cl.
CPC ...... *H04M 3/53383* (2013.01); *H04M 2201/14* (2013.01); *H04M 2201/18* (2013.01)
USPC .......................................... 379/68; 379/88.22

(58) Field of Classification Search
USPC .................. 379/114, 67.1, 88.18, 88.22, 144, 379/88.25, 88.27, 68
See application file for complete search history.

(56) References Cited

U.S. PATENT DOCUMENTS

| | | |
|---|---|---|
| 5,559,867 A | 9/1996 | Langsenkamp et al. |
| 5,822,405 A * | 10/1998 | Astarabadi ................. 379/88.04 |
| 5,912,947 A | 6/1999 | Langsenkamp et al. |
| 5,999,598 A | 12/1999 | Henrick et al. |
| 6,009,149 A | 12/1999 | Langsenkamp |
| 6,496,111 B1 | 12/2002 | Hosack |
| 6,556,664 B1 | 4/2003 | Langsenkamp |
| 6,567,504 B1 | 5/2003 | Kercheval et al. |
| 6,895,000 B2 | 5/2005 | Lai et al. |
| 7,158,621 B2 | 1/2007 | Bayne |
| 7,822,187 B2 | 10/2010 | Korn et al. |
| 8,233,918 B2 | 7/2012 | Roin et al. |
| 2002/0010005 A1 | 1/2002 | Hwang et al. |
| 2004/0033811 A1 * | 2/2004 | Tsai et al. ................. 455/554.1 |
| 2004/0137956 A1 | 7/2004 | Mann |
| 2004/0139318 A1 * | 7/2004 | Fiala et al. ..................... 713/165 |
| 2005/0146743 A1 | 7/2005 | Firooz |
| 2005/0262547 A1 * | 11/2005 | Langlais ....................... 725/135 |
| 2006/0009243 A1 * | 1/2006 | Dahan et al. ................. 455/466 |
| 2007/0286363 A1 * | 12/2007 | Burg et al. ................. 379/88.18 |
| 2008/0228572 A1 | 9/2008 | Teterin |
| 2013/0325973 A1 | 12/2013 | Chu |

* cited by examiner

Primary Examiner — Simon King
(74) Attorney, Agent, or Firm — Baker Botts L.L.P.

(57) ABSTRACT

In one embodiment, a method includes determining whether a user has connected to a voice-message system. The method further includes, automatically and without user input after the connection, prompting the user to create one or more new voice greetings. The method further includes, automatically and without user input after the prompt, beginning to record one or more of the new voice greetings.

20 Claims, 1 Drawing Sheet

RECORDING A NEW VOICE GREETING

TECHNICAL FIELD OF THE INVENTION

This invention relates in general to voice messaging and more particularly to recording a new voice greeting.

BACKGROUND OF THE INVENTION

A user of a voice-messaging system may periodically refresh his voice greeting. The user may recite the date of the new voice greeting when recording the new voice message so that callers who reach the voice mailbox of the user will know how current the voice greeting is.

BRIEF DESCRIPTION OF THE DRAWINGS

To provide a more complete understanding of the present invention and features and advantages thereof, reference is made to the following description, taken in conjunction with the accompanying drawings, in which.

DESCRIPTION OF EXAMPLE EMBODIMENTS

Figure 1:
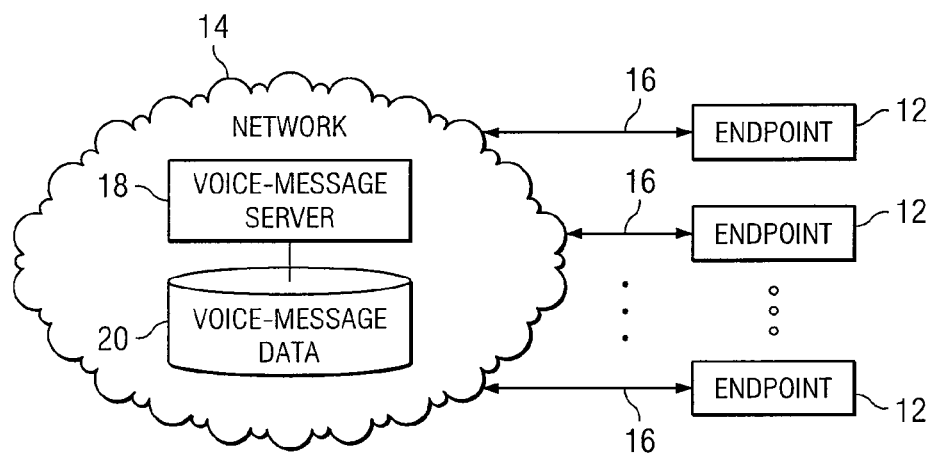
FIG. 1 illustrates an example system for recording a new voice greeting.

FIG. 1 illustrates an example system 10 for recording a new voice greeting. System 10 includes endpoints 12 that communicate with each other via network 14. In particular embodiments, network 14 is a local area network (LAN), a wireless LAN (WLAN), a wide area network (WAN), a metropolitan area network (MAN), a portion of the Internet, or another network 14 or a combination of two or more such networks 14. In particular embodiments, network 14 connects to one or more other networks, such as, for example, the Internet, the Public Switched Telephone Network (PSTN), or both. The present invention contemplates any suitable network 14. One or more links 16 couple an endpoint 12 to network 14. In particular embodiments, one or more links 16 each include one or more wireline, wireless, or optical links 16. In particular embodiments, one or more links 16 each include a LAN, a WLAN, a WAN, a MAN, a portion of the Internet, or another link 16 or a combination of two or more such links 16. The present invention contemplates any suitable links 16 coupling endpoints 12 to network 14.

Endpoints 12 enable users at endpoints 12 to communicate with each other. As an example and not by way of limitation, an endpoint 12 may include a legacy telephone, a telephone having voice over Internet Protocol (VoIP) capabilities, a mobile telephone (which may, but need not, have VoIP capabilities), a personal digital assistant (PDA), a computer system, or another endpoint 12 or a combination of two or more such endpoints 12. A legacy telephone may be a landline telephone set that may generate dual-tone multifrequency (DTMF) signals in response to a user pressing keys on the telephone set. A telephone having VoIP capabilities may be a wireless or wireline Internet Protocol (IP) telephone that may generate data providing DTMF signals in response to a user pressing keys on the telephone or otherwise providing input to the telephone. A mobile telephone may be a wireless telephone capable of connecting to an 802.11 or other WLAN, a cellular telephone network, or both. A computer system may be a notebook computer system capable of connecting to an LAN, a WLAN, or both. To communicate with one or more other users, a user at a computer system coupled to network 14 may access a telephone application on the computer system, a voice-message client at the computer system, a web browser on the computer system capable of accessing a web page or website providing voice-message functionality, or an application on the computer system supporting e-mail (such as, for example, MICROSOFT OUTLOOK or a similar application) including a voice-message form. The present invention contemplates any suitable endpoints 12.

Network 14 includes a voice-message server 18. In particular embodiments, voice-message server 18 includes one or more voice-message servers 18. In particular embodiments, voice-message server 18 is a hardware, software, or embedded logic component or a combination of two or more such components residing at one or more servers in network 14. In particular embodiments, voice-message server 18 includes or has access to one or more databases capable of storing voice-message data 20. Voice-message data 20 may include one or more voice mailboxes that may each receive voice messages left for a user and provide the user access to the voice messages. A user may have access to one or more voice mailboxes. Each voice mailbox may have one or more voice greetings that voice-message server 18 plays to a caller before prompting the caller to leave a voice message for the user. In particular embodiments, a voice mailbox has a first voice greeting that voice-message server 18 plays to first callers (such as, for example, callers calling from inside a private LAN that includes voice-message server 18) and a second voice greeting that voice-message server 18 plays to second callers (such as, for example, callers calling from outside a private LAN that includes voice-message server 18). A voice greeting may be a voice message left by the user, such as, for example, "Hello. You've reached Tim Fujita-Yuhas. It's now 7:00 a.m. on 3 Aug. 2006, and I'll be out of the office all day today. Please leave a message, and I'll get back to you as soon as I can. Thanks." The user may periodically refresh the voice greeting. As an example, the next day, the user may record a new voice greeting, such as, for example, "Hello. You've reached Tim Fujita-Yuhas. Today's date is 4 Aug. 2006, and it's now 7:15 a.m. I'm in the office today, but I'll be at a meeting away from my desk between 8:00 a.m. and noon. Please leave a message, and I'll get back to you as soon as I can. Thanks." The voice greeting may include one or more video components, such as, for example, a video of the user leaving the voice greeting, recorded at the same time as the voice greeting. Reference to a "voice greeting" encompasses a voice greeting with one or more audio components and no video components, a voice greeting with one or more audio components and one or more video components, or both, where appropriate.

Voice-message server 18 provides voice-message functionality to one or more endpoints 12. As an example and not by way of limitation, a user at mobile telephone coupled to network 18 my provide input instructing the mobile telephone to connect to voice-message server 18. The mobile telephone may connect to voice-message server 18, and voice-message server 18 may prompt the user to enter a passcode to access a voice mailbox of the user or otherwise authenticate the user before providing the user access to the voice mailbox. As described below, voice-message server 18 may prompt the user to record a new voice greeting, which the user may do before proceeding to check one or more voice messages in the voice mailbox left for the user. The user may provide input instructing voice-message server 18 to play one or more voice messages from the voice mailbox, and voice-message server 18 may play the voice messages to the user.

After each voice message, the user may provide input at the telephone specifying handling instructions to voice-message server 18 corresponding to the voice message. The handling instructions may direct voice-message server 18 to replay the voice message, delete the voice message, save the voice message, forward the voice message to one or more other users, communicate a response to the voice message, or carry out one or more other tasks. The present invention contemplates any suitable voice-message system.

In particular embodiments, voice-message server 18 prompts a user to record a new voice greeting. As an example and not by way of limitation, in response to the user connecting to voice-message server 18, voice-message server 18 may, automatically and without requiring any input from the user, prompt the user to record a new voice greeting and after the prompt (and perhaps a "beep" communicated to the user) begin recording the new voice greeting. Voice-message server 18 may provide the user access to other voice-message functionality (such as, for example, playing back voice messages left for the user) after the user has recorded the new voice greeting. In particular embodiments, automatically prompting the user to record a new voice greeting serves as a reminder to the user record the new voice greeting. In particular embodiments, automatically beginning to record the new voice greeting obviates the user providing input (such as, for example, a series of DTMF keystrokes) to initiate the recording, which may save the user time and simplify the interaction between the user and voice-message server 18.

In particular embodiments, voice-message server 18 prompts a user to record a new voice greeting periodically. As an example and not by way of limitation, voice-message server 18 may prompt the user to record a new voice greeting if the age of the current voice greeting exceeds a predetermined threshold, such as, for example, twenty-four hours. If the user has not recorded a new voice greeting sometime during the twenty-fours preceding the current connection between the user and voice-message server 18, voice-message server 18 may automatically and without user input prompt the user to record a new voice greeting and, after the prompt, begin recording the new voice greeting. On the other hand, if the user has recorded a new voice greeting sometime during the twenty-fours preceding the current connection between the user and voice-message server 18, voice-message server 18 may forgo automatically and without user input prompting the user to record a new voice greeting and, after the prompt, beginning to record the new voice greeting. As another example, voice-message server 18 may prompt the user to record a new voice greeting according to the time of the current connection between the user and voice-message server 18. If the time of the current connection with respect to a predetermined schedule indicates the user should create a new voice greeting, voice-message server 18 may automatically and without user input prompt the user to record a new voice greeting and, after the prompt, begin recording the new voice greeting. As an example and not by way of limitation, the user may instruct voice-message server 18 to prompt the user to record a new voice greeting when the user first connects to voice-message server 18 at or after 7:00 a.m. every day, except on weekends and holidays.

In particular embodiments, a user instructs voice-message server 18 whether, when, and how to prompt the user to record a new voice greeting. As an example and not by way of limitation, the user may configure a voice mailbox of the user such that voice-message server 18 does not ever prompt the user to record a new voice greeting. The user may alternatively configure the voice mailbox to prompt the user periodically according to one or more rules specified by the user. As another example, the user may configure the voice mailbox such that voice-message server 18 initiates a connection (which may involve voice-message server 18 automatically calling the user at a telephone number of the user or otherwise automatically contacting the user) between the user and voice-message server 18 to prompt the user to record a new voice greeting. The user may alternatively configure the voice mailbox such that voice-message server 18 does not initiate a connection between the user and voice-message server 18 to prompt the user, but instead waits for the user to initiate a connection between the user and voice-message server 18 to prompt the user. As another example, the user may configure the voice mailbox such that voice-message server 18 prompts the user to record a new voice greeting if the age of the current voice greeting exceeds a threshold, such as, for example, twenty-four hours. As another example, the user may configure the voice mailbox such that voice-message server 18 prompts the user to record a new voice greeting according to the time of the current connection (which voice-message server 18 may initiate to prompt the user to record a new voice greeting) between the user and voice-message server 18.

Figure 2:
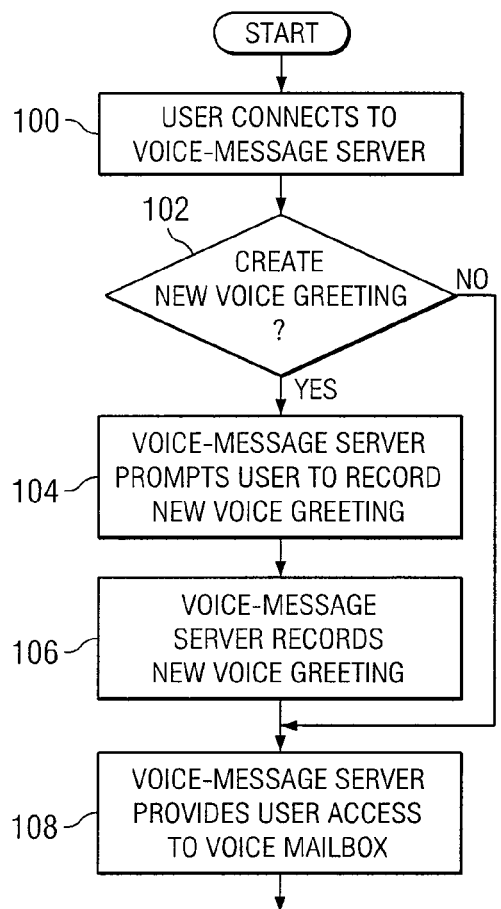
FIG. 2 illustrates an example method for recording a new voice greeting.

FIG. 2 illustrates an example method for recording a new voice greeting. The method begins at step 100, where a user connects to voice-message server 18. As an example and not by way of limitation, the user may use an endpoint 12 to call voice-message server 18. At step 102, if voice-message server 18 determines to prompt the user to record a new voice greeting, the method proceeds to step 104. As described above, in particular embodiments, voice-message server 18 determines whether to prompt the user to record a new voice greeting according to the time of the connection or the age of the current voice greeting. At step 104, automatically and without input from the user, voice-message server 18 prompts the user to record a new voice greeting. At step 106, after providing the prompt to the user, voice-message server 18 begins to record the new voice greeting automatically and without user input and the user records the new voice greeting. At step 108, voice-message server 18 provides the user access to voice-message functionality available at voice-message server 18, at which point the method ends. As an example and not by way of limitation, voice-message server 18 may receive input from the user instructing voice-message server 18 to play one or more voice messages left for the user and voice-message server 18 may play the messages to the user. At step 102, if voice-message server 18 determines not to prompt the user to record a new voice greeting, the method proceeds to step 108.

Although particular steps in the method illustrated in FIG. 2 have been illustrated and described as occurring in a particular order, the present invention contemplates any suitable steps of the method illustrated in FIG. 2 occurring in any suitable order. Although the method illustrated in FIG. 2 involves four users and two introductions, the present invention contemplates any suitable number of users and suitable number of introductions.

Figure 3:
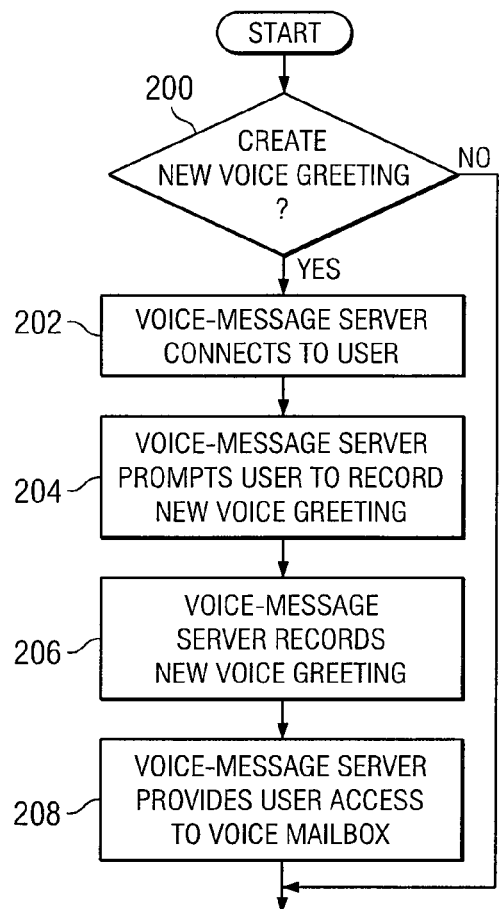
FIG. 3 illustrates another example method for recording a new voice greeting.

FIG. 3 illustrates an example method for recording a new voice greeting. The method begins at step 200, where voice-message server 18 determines whether to prompt a user to record a new voice greeting. As described above, in particular embodiments, voice-message server 18 determines whether to prompt the user to record a new voice greeting according to the current time or the age of the current voice greeting. At step 200, if voice-message server 18 determines not to prompt the user to record a new voice greeting, the method ends. At step 200, if voice-message server 18 determines to prompt the user to record a new voice greeting, the method proceeds to step 202, where voice-message server 18 connects to the user. As an example and not by way of limitation, to connect to the user, voice-message server 18 may call the user at a telephone number previously specified by the user. At step 204, automatically and without input from the user, voice-message server 18 prompts the user to record a new voice greeting. At step 206, after providing the prompt to the user, voice-message server 18 begins to record the new voice greeting automatically and without user input and the user records the new voice greeting. At step 208, voice-message server 18 provides the user access to voice-message functionality available at voice-message server 18, at which point the method ends.

Although particular steps in the method illustrated in FIG. 3 have been illustrated and described as occurring in a particular order, the present invention contemplates any suitable steps of the method illustrated in FIG. 3 occurring in any suitable order. Although the method illustrated in FIG. 3 involves four users and two introductions, the present invention contemplates any suitable number of users and suitable number of introductions.

Particular embodiments have been used to describe the present invention, and a person having skill in the art may comprehend one or more changes, substitutions, variations, alterations, or modifications within the scope of the appended claims. The present invention encompasses all such changes, substitutions, variations, alterations, and modifications.

What is claimed is:

1. An apparatus comprising:
   one or more processors; and
   a memory coupled to the processors comprising instructions executable by the processors, the processors operable when executing the instructions to:
   determine that a user has connected to a voice-message system;
   automatically and without user input after the user has connected to the voice-message system, prompt the user to create one or more new outgoing voice greetings to be played to incoming callers of said user's voice messaging mailbox;
   automatically and without user input after the prompt, begin recording one or more of the new outgoing voice greetings; and
   wherein the processors are further operable when executing the instructions to prompt the user and record one or more of the new outgoing voice greetings only if an age of a current outgoing voice greeting of the user exceeds a predetermined threshold.

2. The apparatus of claim 1, wherein the user called the voice-message system to connect to the voice-message system.

3. The apparatus of claim 1, wherein the voice-message system called the user to connect the user to the voice-message system.

4. The apparatus of claim 1, wherein the user entered a passcode to connect to the voice-message system.

5. The apparatus of claim 1, wherein the predetermined threshold is twenty-four hours.

6. The apparatus of claim 1, wherein the processors are further operable when executing the instructions to prompt the user and record one or more of the new outgoing voice greetings before the user checks any voice messages left for the user.

7. The apparatus of claim 1, wherein one or more servers supporting the voice-message system comprise the processors and the memory.

8. The apparatus of claim 1, wherein one or more of the outgoing voice greetings comprise one or more audio components and one or more video components.

9. An apparatus comprising:
   one or more processors; and
   a memory coupled to the processors comprising instructions executable by the processors, the processors operable when executing the instructions to:
   determine whether a user has connected to a voice-message system;
   automatically and without user input after the user has connected to the voice-message system, prompt the user to create one or more new outgoing voice greetings to be played to incoming callers of said user's voice messaging mailbox;
   automatically and without user input after the prompt, begin recording one or more of the new outgoing voice greetings;
   wherein the processors are further operable when executing the instructions to prompt the user and record one or more of the new outgoing voice greetings only if an age of a current outgoing voice greeting of the user exceeds a predetermined threshold; and
   wherein the processors are further operable when executing the instructions to prompt the user and record one or more of the new outgoing voice greetings only if a time of the connection to the voice-message system with respect to a predetermined schedule indicates the user should create one or more of the new outgoing voice greetings.

10. The apparatus of claim 9, wherein the predetermined schedule indicates the user should create one or more of the new outgoing voice greetings at approximately seven o'clock in the morning.

11. A method comprising:
    determining that a user has connected to a voice-message system;
    automatically and without user input after the user has connected to the voice-message system, prompting the user to create one or more new outgoing voice greetings to be played to incoming callers of said user's voice messaging mailbox;
    automatically and without user input after the prompt, beginning to record one or more of the new outgoing voice greetings; and
    further comprising prompting the user and recording one or more of the new outgoing voice greetings only if an age of a current outgoing voice greeting of the user exceeds a predetermined threshold.

12. The method of claim 11, wherein the user called the voice-message system to connect to the voice-message system.

13. The method of claim 11, wherein the voice-message system called the user to connect the user to the voice-message system.

14. The method of claim 11, wherein the user entered a passcode to connect to the voice-message system.

15. The method of claim 11, wherein the predetermined threshold is twenty-four hours.

16. The method of claim 11, further comprising prompting the user and recording one or more of the new outgoing voice greetings before the user checks any voice messages left for the user.

17. The method of claim 11, wherein one or more of the outgoing voice greetings comprise one or more audio components and one or more video components.

18. A method comprising:
    determining whether a user has connected to a voice-message system;

automatically and without user input after the connection, prompting the user to create one or more new outgoing voice greetings to be played to incoming callers of said user's voice messaging mailbox;

automatically and without user input after the prompt, beginning to record one or more of the new outgoing voice greetings;

further comprising prompting the user and recording one or more of the new outgoing voice greetings only if an age of a current outgoing voice greeting of the user exceeds a predetermined threshold; and further comprising prompting the user and recording one or more of the new outgoing voice greetings only if a time of the connection to the voice-message system with respect to a predetermined schedule indicates the user should create one or more of the new outgoing voice greetings.

19. The method of claim 18, wherein the predetermined schedule indicates the user should create one or more of the new outgoing voice greetings at approximately seven o'clock in the morning.

20. A system comprising:

means for determining that a user has connected to a voice-message system;

means for automatically and without user input after the user has connected to the voice-message system, and only if an age of a current outgoing voice greeting of the user exceeds a predetermined threshold, prompting the user to create one or more new outgoing voice greetings to be played to incoming callers of said user's voice messaging mailbox; and means for automatically and without user input after the prompt, beginning to record one or more of the new outgoing voice greetings.

* * * * *